Figure 1:
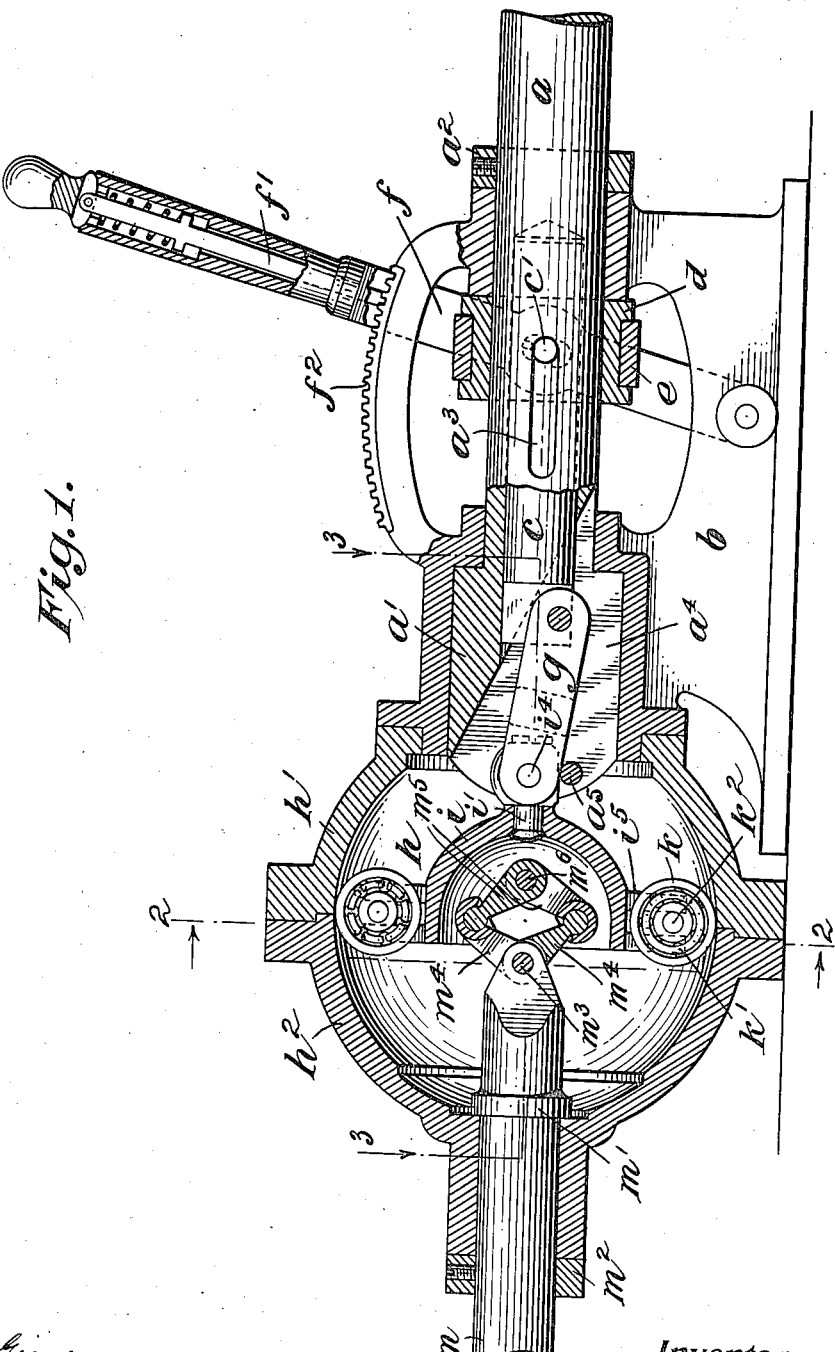

C. W. WEISS.
POWER TRANSMISSION DEVICE.
APPLICATION FILED MAY 14, 1913.

1,146,982.

Patented July 20, 1915.
9 SHEETS—SHEET 1.

Attest:

Inventor:
Carl W. Weiss
by Redding, Greeley & Goodlett
Attys.

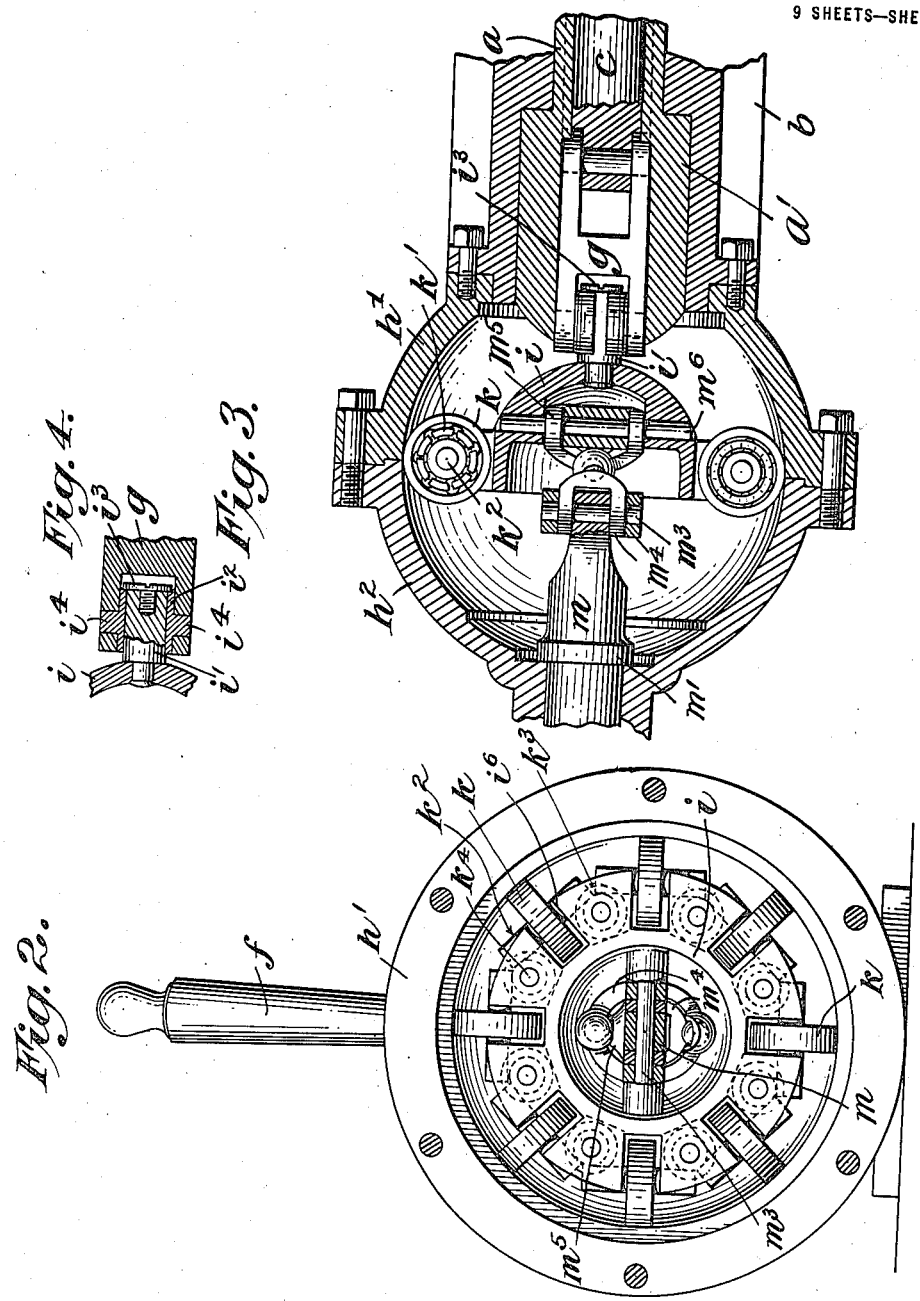

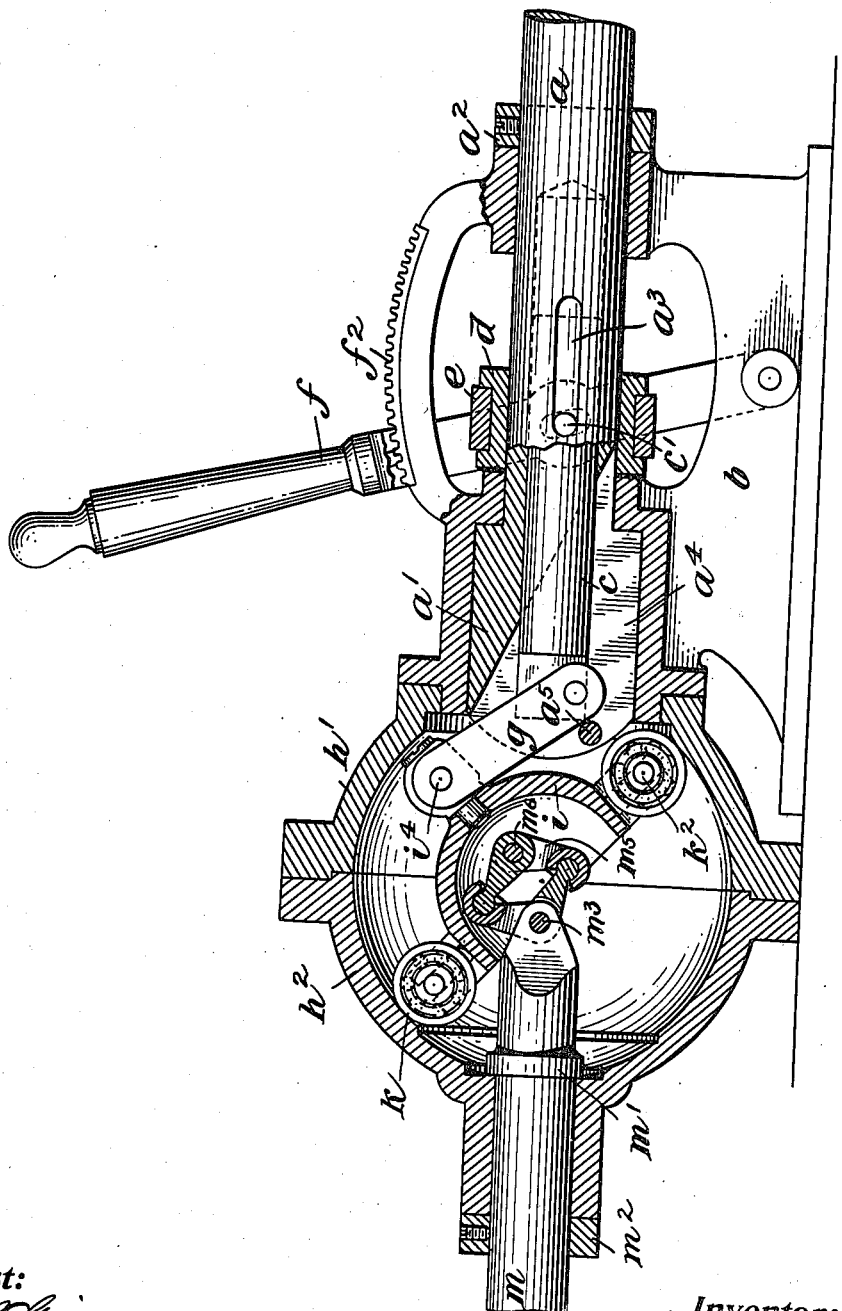

C. W. WEISS.
POWER TRANSMISSION DEVICE.
APPLICATION FILED MAY 14, 1913.
1,146,982.
Patented July 20, 1915.
9 SHEETS—SHEET 4.
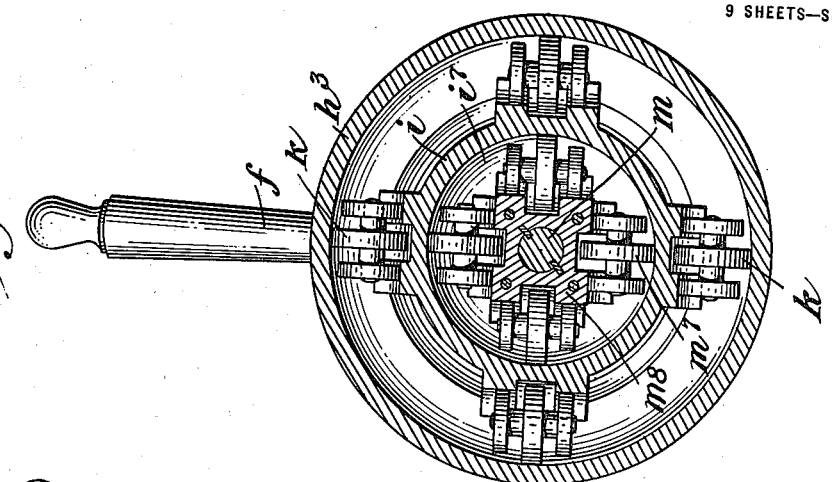
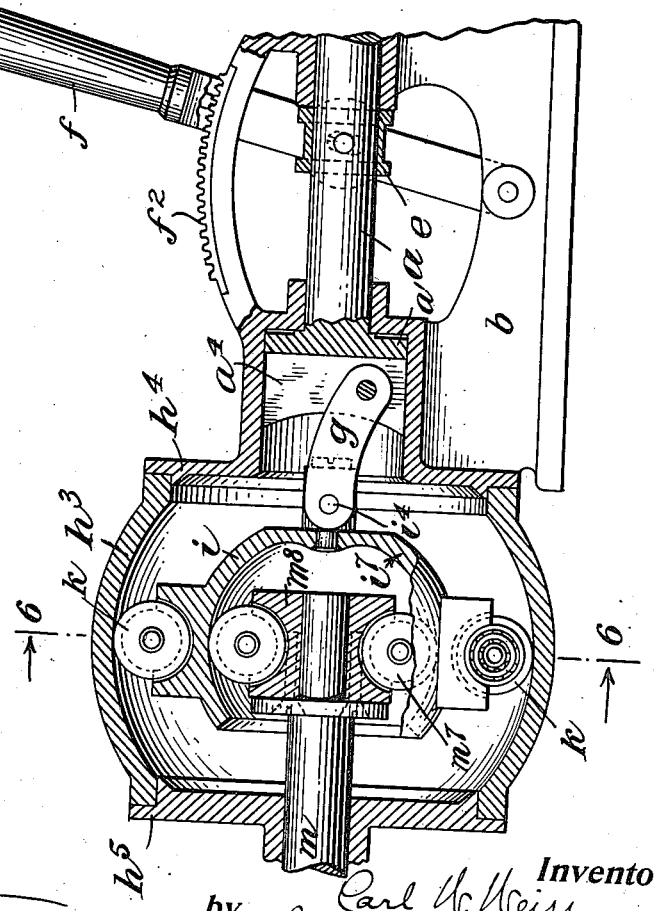
Inventor:
Carl W. Weiss
by Redding, Greeley & Goodlett
Attys.

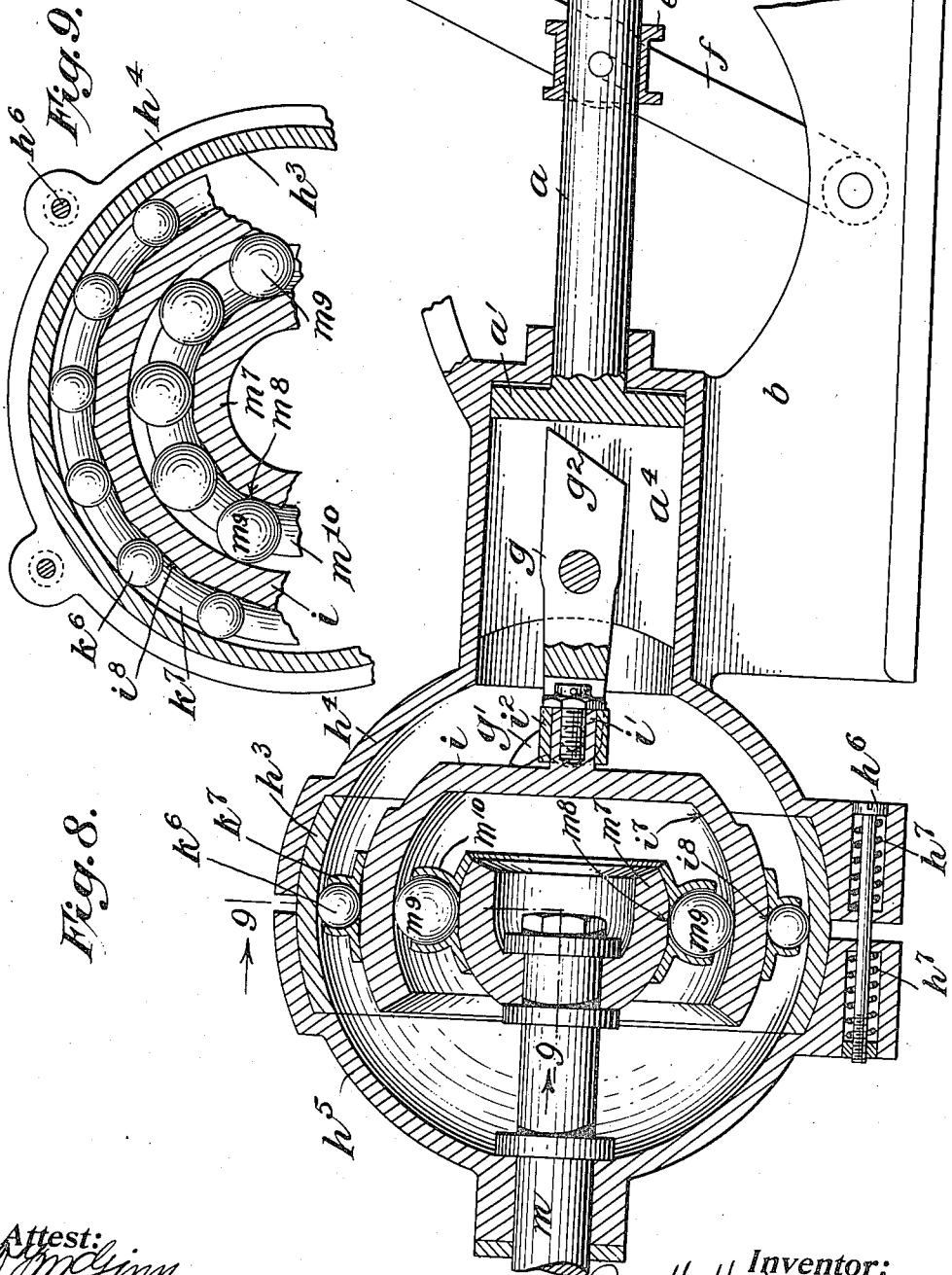

C. W. WEISS.
POWER TRANSMISSION DEVICE.
APPLICATION FILED MAY 14, 1913.

1,146,982.

Patented July 20, 1915.
9 SHEETS—SHEET 6.

Attest:

Inventor:
by
Attys.

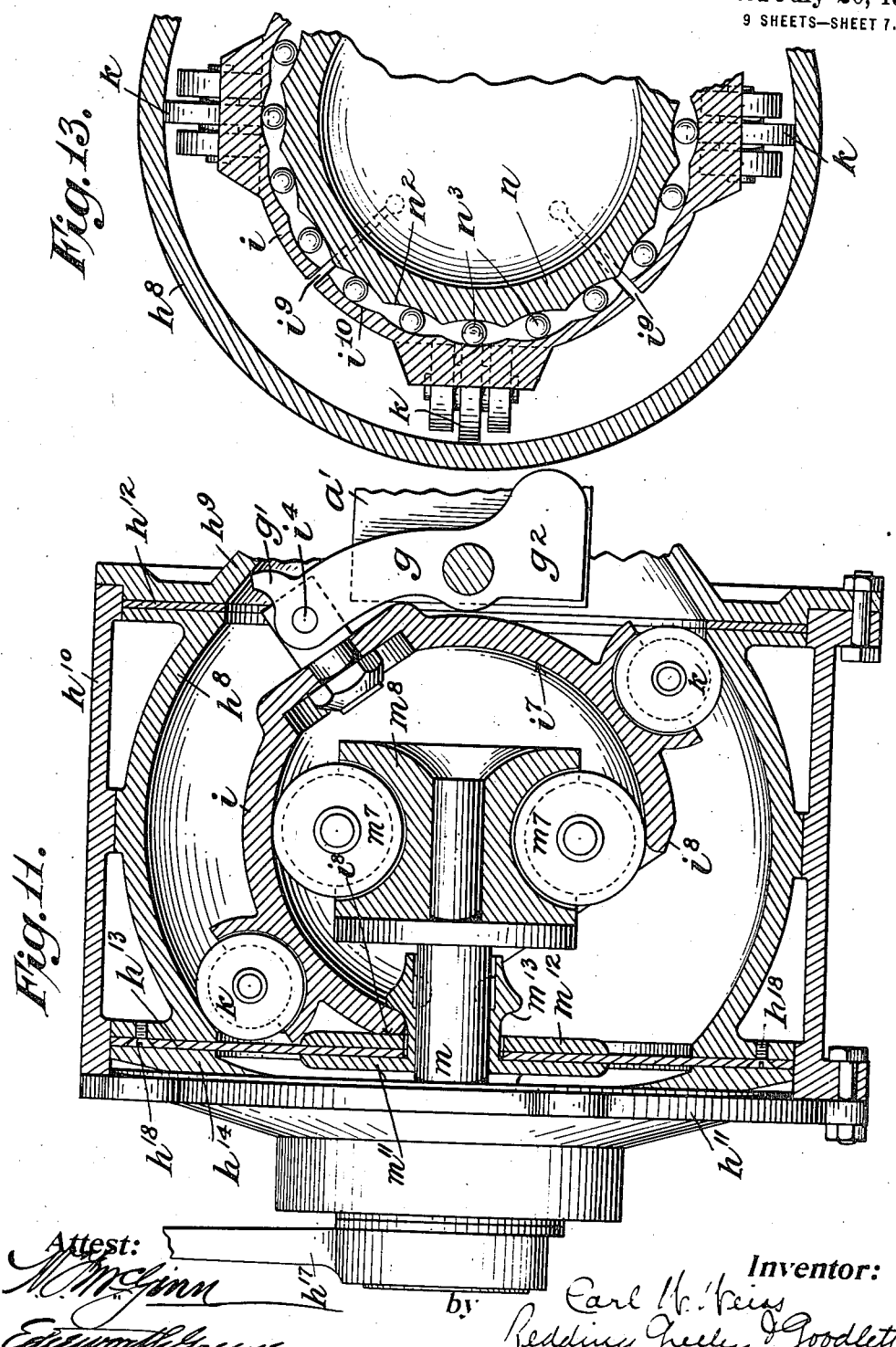

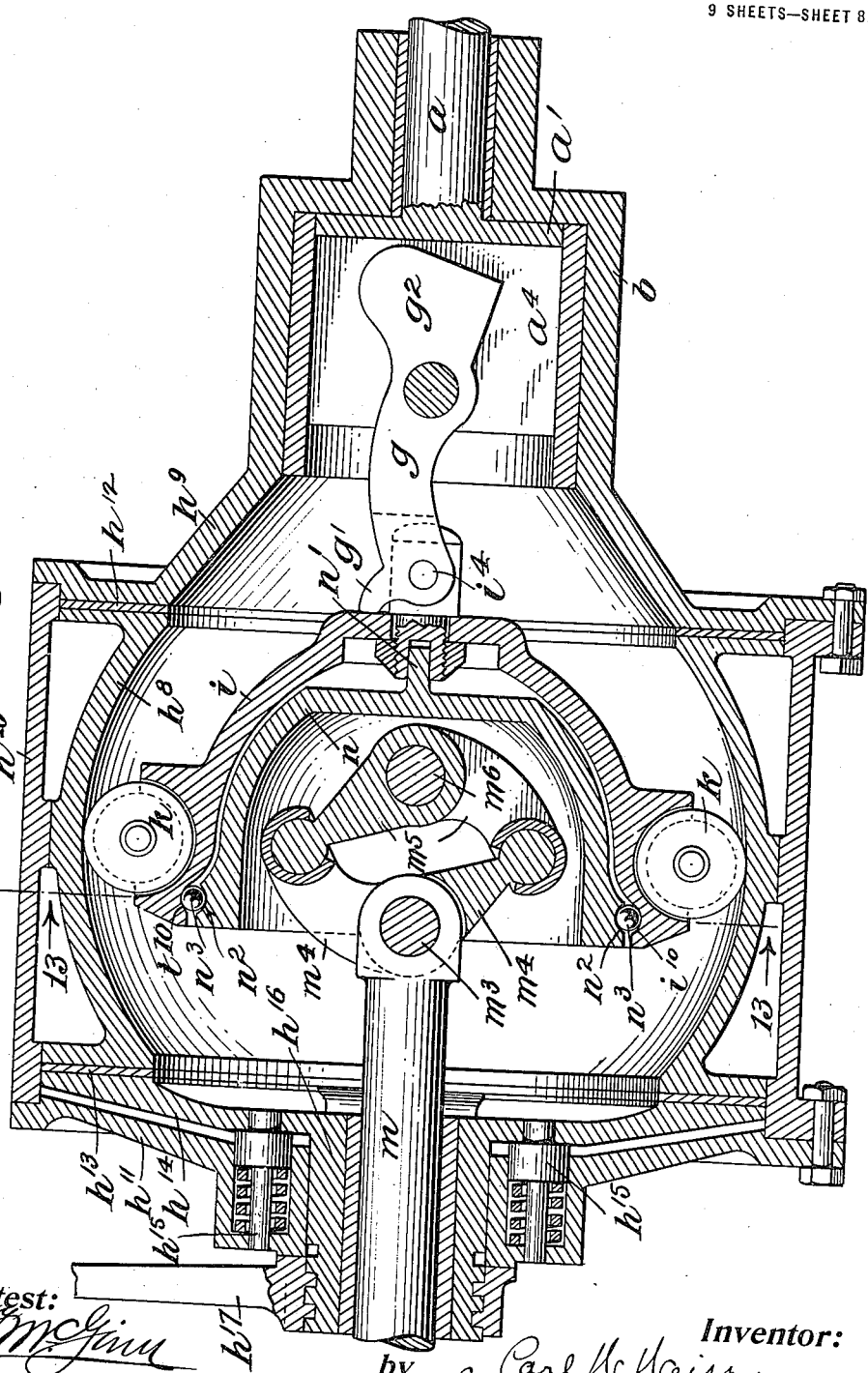

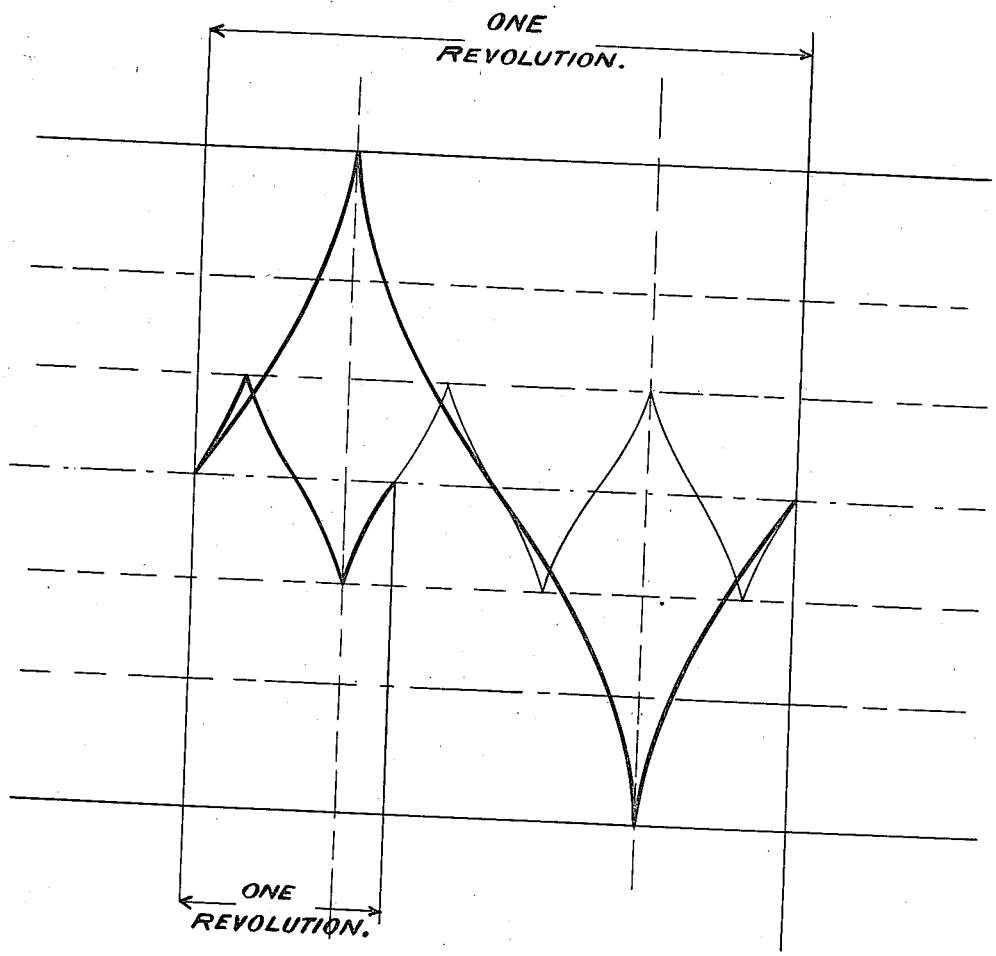

UNITED STATES PATENT OFFICE.

CARL W. WEISS, OF NEW YORK, N. Y.

POWER-TRANSMISSION DEVICE.

1,146,982.  Specification of Letters Patent.  Patented July 20, 1915.

Application filed May 14, 1913. Serial No. 767,604.

*To all whom it may concern:*

Be it known that I, CARL W. WEISS, a citizen of the United States, residing in the borough of Brooklyn of the city of New York, in the county of Kings, in the State of New York, have invented certain new and useful Improvements in Power-Transmission Devices, of which the following is a specification, reference being had to the accompanying drawings, which form a part hereof.

This invention relates to devices for transmitting power, at a variable speed, from one moving part to another.

The object of the invention is to produce such a device which shall be complete in itself, simple and compact in structure, not subject to slip or excessive wear yet not employing toothed gears or dependent upon frictional drive, showing no material loss in efficiency, and capable of transmitting power at any speed from zero to the maximum permitted by the construction. By these characteristics the improved device is distinguished from previous forms of transmission devices, whether geared or frictional or hydraulic.

Described generally the new transmission device comprises a rotatable mutor or power transmitting body through the functioning of which the speed variation is accomplished, a coöperating body concentric with the mutor, one of these parts having a spherical bearing surface and the other having gripping elements to coöperate with the spherical bearing surface, means to vary the relative angular axial position of such bodies, means to rotate one of such bodies and means to transmit rotation from the other of such bodies. In the forms of the device described hereinafter the power is transmitted from the driver to the driven part through a nutating body or mutor, which, receiving its movement of nutation from the driver, acquires, through such movement of nutation, a continuous forward movement of rotation about its own axis, which it transmits to the driven part, or imparts a continuous forward movement of rotation to the driven part through its movement of nutation, whether it has a movement of rotation of its own or not. The speed of the forward movement of rotation of the nutating body, relative to the movement of rotation of the driver or the speed of rotation of the driven part, relative to the movement of rotation of the driver, is dependent upon the angular displacement of the axis of rotation of the nutating body with respect to the axis of nutation, being zero when that angular displacement is zero and increasing as the angle of displacement increases. By varying the angular displacement of the nutating body it is therefore possible to vary the speed ratio between the driver and the driven part from zero to the maximum, the maximum being determined by the maximum angular displacement of the nutating body which is the practicable limit of displacement imposed by structural considerations. In order that the nutating body or mutor may acquire a movement of rotation about its own axis through its nutating movement or that the driven part may acquire a movement of rotation through the nutation of the nutating body, it is necessary that a non-nutating body, whether stationary or rotatable about its own axis, shall coöperate with the nutating body. It will be evident that the construction and arrangement of the nutating body, of its coöperating part, of the means by which the nutating movement is imparted to the nutating body from the driver and of the means by which the rotary movement of the nutating body about its own axis is communicated to the driven part or by which the driven part acquires a movement of rotation from the nutation of the nutating body, may be varied to suit different applications of the improved power transmitting device and various requirements and conditions of use and in the accompanying drawings are illustrated several different embodiments of the invention.

Figure 10:
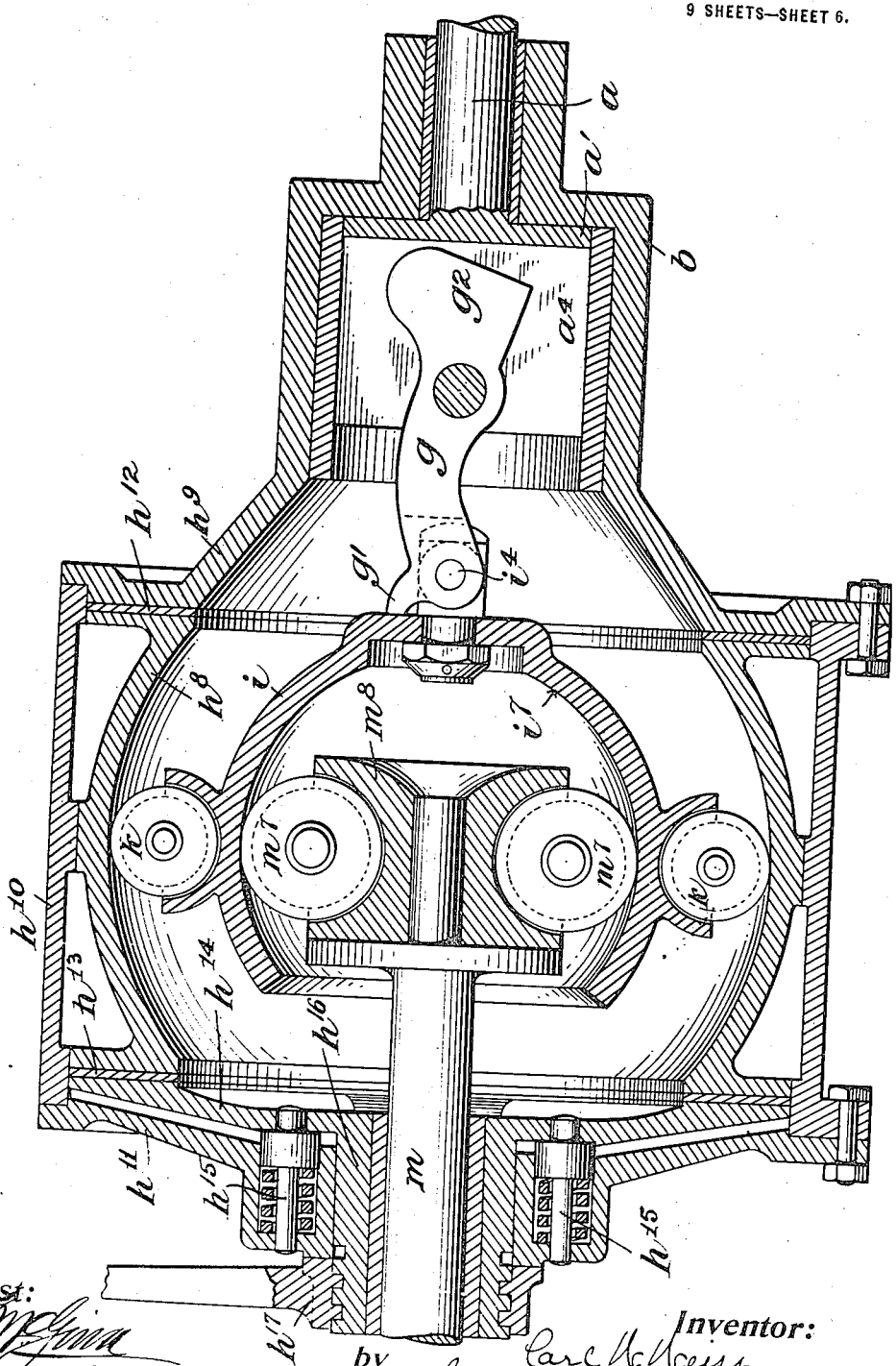

In the drawings—Figure 1 is a view, partly in longitudinal central section and partly in elevation of one form of the improved transmitting device, the nutating body or mutor being shown in the position which it occupies when its axis of rotation coincides with its axis of nutation. Fig. 2 is a view in sectional elevation, the plane of section being indicated by the line 2—2 of Fig. 1 and the direction of sight being indicated by the arrows thereon. Fig. 3 is a sectional plan view of some of the parts shown in Fig. 1. Fig. 4 is a detail view in section of the connections between the link and the nutating body. Fig. 5 is a view similar to Fig. 1, but with the nutating body in the position of maximum angular displacement. Figs. 6 and 7 are views which illustrate another embodiment of the invention which differs from that shown in Figs. 1-5 especially in the means for transmitting movement of rotation from the nutating body to the driven part. Figs. 8 and 9 are views which illustrate a further embodiment of the invention, showing balls in place of the rollers shown in the preceding figures of the drawings and showing also provisions for permitting such yielding as will prevent breakage in case of emergencies. Fig. 10 is a view illustrating a further embodiment of the invention showing particularly means for controlling the yielding of the parts so as to prevent breakage in case of emergency and for preventing at will the transmission of power through the device regardless of the angular displacement of the nutating body. Fig. 11 is a detail view showing a further modification of the construction shown in Fig. 10. Figs. 12 and 13 are views illustrating still another embodiment of the invention which differs from the other forms shown especially in the devices for securing the necessary coaction between the nutating body and its coöperating part. Fig. 14 is a diagrammatic and graphical illustration of two paths taken by the mutor during one revolution of the driving shaft at each of two different angles of nutation.

In the embodiment of the invention illustrated in Figs. 1-5 the driving part or shaft $a$ is shown as mounted for rotation in suitable bearings on a standard $b$, having an enlarged head $a'$ and a collar $a^2$ by which longitudinal movement of the shaft is prevented. The shaft $a$ is bored axially from the head end to receive a longitudinally movable bar $c$ which rotates with the shaft $a$. Pins $c'$ project from the bar $c$ through longitudinal slots $a^3$ and are engaged by a grooved collar $d$. The latter is encircled by a loose collar $e$ which is engaged by a forked lever $f$, pivoted on the base $b$. The lever $f$ is provided with a spring detent $f'$ for engagement with a fixed rack $f^2$. By these means provision is made for the longitudinal shifting of the bar $c$ whether the shaft $a$ is rotating or not. In the end of the bar $c$, but eccentrically with respect thereto, is pivoted a link $g$ which forms the means by which the movement of nutation is imparted to the nutating body or mutor from the driver and by which the angular displacement of the nutating body or mutor is effected, as hereinafter described. The head $a'$ of the shaft $a$ is slotted as at $a^4$ to receive the link.

In all of the embodiments of the invention illustrated in the drawings the non-nutating part which coöperates with the nutating body or mutor is shown as an internally spherical stationary bearing $h$ and such an embodiment of the coöperating part is preferable for most applications of the improved power transmission device, but in the embodiment of the invention shown in Figs. 6 and 7 and in Figs. 8 and 9 there is also shown a non-nutating part for coöperation with the nutating body or mutor which is internal with respect to the nutating body and is itself rotatable, as hereinafter described, and it will therefore be understood that the coöperating part is not necessarily external to the nutating body or mutor nor stationary.

In the form shown in Figs. 1-5 the coöperating part $h$ is shown as two hemispherical shells $h^1$ and $h^2$ which are secured together while one of them, as $h^1$, is secured to the bearing of the head $a'$ of the shaft $a$ on the base $b$. The interior of the bearing, for an angular distance of about forty-five degrees from the median vertical plane, is formed internally with a truly spherical, hardened surface.

The nutating body or mutor $i$ is shown in Figs. 1-5 as a cup-shaped body or cage which is supported within the coöperating body or bearing $h$ and is adapted to have therein a movement of nutation and a movement of rotation about its own axis. The movement of nutation is imparted to it from the driving shaft $a$ through the medium of the link $g$. To the nutating body or mutor $i$ is secured axially a stud $i'$ which is embraced by a two-part sleeve $i^2$, the stud being provided at its end with a large headed screw $i^3$ to prevent slipping of the sleeve endwise from the stud. The sleeve has trunnions $i^4$ which are received in the checkpiece of the forked link $g$. The details of this construction are shown clearly in Figs. 3 and 4.

There are mounted on the nutating body of mutor $i$, rollers $k$ which are supported by roller bearings $k'$ on shafts $k^2$. The latter are supported on rollers $k^3$, shown in dotted lines in Fig. 2, which are mounted in a circumferential groove in the web $i^5$ of the nutating body or mutor, on short shafts $k^4$ which are parallel with the axis of rotation of the nutating body or mutor. The rollers $k$ are disposed in radial slots $i^6$ in the flange or web of the nutating body or mutor and are narrower than the slots respectively. Each roller $k$ therefore is free for limited movement in either direction on a tangent or chord of the arc of a circle the center of which coincides with the axis of rotation of the nutating body or mutor. It will be evident that movement of the roller to one side or the other of the slot $i^6$, from a middle position, increases slightly the radial distance of the surface of the roller which is next the bearing $h$ from the axis of rotation of the nutating body or mutor and from the center of the spherical bearing, through which center the axis of rotation of the nutating body or mutor and the axis of nutation thereof pass and in which they intersect.

The nutating body or mutor is so supported within the bearing as to have a free nutating movement and a free movement of rotation in the direction of rotation of the driver $a$ and to have, against the bearing, points of contact which, though constantly changing with the nutating movement and with the rotating movement, are points of resistance against which the force, or one component of the force, which is transmitted from the driver, reacts. For this purpose there are mounted on the nutating body or mutor $i$, rollers $k$ which are supported by roller bearings $k'$ on shafts $k^2$. The latter are supported on rollers $k^3$, shown in dotted lines in Fig. 2, which are mounted in a circumferential groove in the web $i^5$ of the nutating body or mutor, on short shafts $k^4$ which are parallel with the axis of rotation of the nutating body or mutor. The rollers $k$ are disposed in radial slots $i^6$ in the flange or web of the nutating body or mutor and are narrower than the slots respectively. Each roller $k$ therefore is free for limited movement in either direction on a tangent or chord of the arc of a circle the center of which coincides with the axis of rotation of the nutating body or mutor. It will be evident that movement of the roller to one side or the other of the slot $i^6$, from a middle position, increases slightly the radial distance of the surface of the roller which is next the bearing $h$ from the axis of rotation of the nutating body or mutor and from the center of the spherical bearing, through which center the axis of rotation of the nutating body or mutor and the axis of nutation thereof pass and in which they intersect. Each roller bears normally against the spherical bearing and rotates freely on its own axis, as it must to permit the free nutating movement of the mutor, and movement of the roller to one side or the other of the slot $i^6$ causes the surface of the roller to press tightly against the spherical bearing surface, and therefore to furnish a point of reactance, which the nutating body or mutor must have on the coöperating body or spherical bearing in order that the mutor may acquire a forward rotary movement with its nutating movement. The resistance of the driven shaft is sufficient to cause such shifting of the rollers in their slots, so as to create the necessary pressure between the rollers and the spherical bearing and as the load on the driven shaft increases the pressure between the rollers and the spherical bearing will also increase, so that any degree of power, within the resistance of the rollers and their bearings to crushing strains, will be transmitted without slip between the nutating body or mutor and the coöperating body or spherical bearing. The reactance of the rollers against the spherical bearing during the nutating movement of the mutor causes the forward rotation of the nutating body or mutor on its own axis in the direction of rotation of the driver, and the extent of such forward rotation at each nutation is dependent upon the angle of the nutating movement.

It will be seen that when the axis of rotation of the nutating body or mutor coincides with the axis of nutation, which is also the axis of rotation of the driver $a$, the sleeve $i^2$ which is carried in the end of the link $g$ will rotate freely about the stud $i'$ and that there will then be no nutating movement of the mutor $i$, which is stationary. In this position the mutor $i$ cannot be rotated in either direction, since the shifting of the mutor in either direction with respect to the rollers $k$ causes them to bear against the coöperating body or spherical bearing so as to prevent further movement. It will also be seen that if the bar $c$ be moved longitudinally toward the left in Fig. 1 it will, since the link $g$ is pivoted eccentrically in the end of the bar $c$, change the angular position of the nutating body or mutor toward the position shown in Fig. 5. A stop pin $a^5$ in the head $a'$ of the shaft $a$ prevents movement of the link in the opposite direction from its position of rest. As the angle of the axis of rotation of the nutating body or mutor increases with respect to the axis of nutation, the speed ratio between the rotation of the driver and the rotation of the nutating body or mutor on its own axis will decrease from infinity toward one, and when an angular displacement of forty-five degrees has been reached the ratio will be about ten to three.

It remains now to describe the means by which the movement of rotation of the nutating body or mutor is imparted to the driven part or shaft $m$. In the construction shown in Figs. 1–5 this result is accomplished by a direct connection which nevertheless has such flexibility as to permit the nutating movement of the mutor to take place freely. As shown, the shaft $m$ is mounted in a bearing formed with the part $h^2$ of the casing and is held from longitudinal movement therein by an integral collar $m^1$ inside of the bearing and a removable collar $m^2$ outside of the bearing. On a pin $m^3$ which passes transversely through the inner end of the shaft $m$ are pivoted two links $m^4$ which have respectively a ball and socket connection with two similar links $m^5$ which are pivoted on a pin $m^6$ which passes transversely through the nutating body or mutor $i$. This link connection forms a means for transmitting the rotary motion of the nutating body or mutor on its own axis to the driven part and is satisfactory for the purpose where the power to be transmitted is not too great or where the construction is such as to permit heavy linkage to be employed and where a minimum speed ratio of about ten to three between the driver and the driven part is satisfactory. Other forms of transmitting means between the mutor and the driven part may be preferred, however, when considerable power is to be transmitted and when a smaller minimum speed ratio is desired and such other forms will be described hereinafter with reference to other figures of the drawings in which they are illustrated.

In the new transmission gear, the mutor is driven by a link which connects the driving shaft to what may be called the crank pin of the mutor, the spherical shell or body being fixed. Assuming that the point of connection of the link to such crank pin of the mutor lies in a sphere of the same radius as the spherical shell, it will be seen that the mathematical or imaginary crank arm by which the mutor is nutated varies with the angle between the axis of the mutor and the axis of the driving shaft. When the mutor is in the position shown in Fig. 1 of the drawings and the angle between the axis of the mutor and the axis of the driving shaft is zero, such mathematical or imaginary crank arm is zero. As the angle is increased, as shown, for example, in Fig. 5, the mathematical or imaginary crank arm is increased. If the angle were increased to 90° (which is practically impossible) the mathematical or imaginary crank arm would then be the same as the radius of the spherical shell. When the angle between the axis of the mutor and the axis of the driving shaft is zero and the mathematical crank arm is zero the driving shaft rotates freely at full speed and the driven shaft is stationary. The ratio of the speed of the driving shaft to the speed of the driven shaft is therefore infinity. If the angle between the axis of the mutor and the axis of the driving shaft could be increased to 90° (which is possible theoretically but not practically) and the mathematical crank arm could become the same as the radius of the spherical shell, or unity, then the speed of the driven shaft would be the same as the speed of the driving shaft and the ratio of the speed of the driving shaft to the speed of the driven shaft would be as 1 to 1, or unity. The ratio of the speed of the driving shaft to the speed of the driven shaft therefore decreases from infinity to unity with the increase of the angle between the axis of the mutor and the axis of the driving shaft, but not in the same ratio. It is found that the speed ratio decreases inversely as the versed sine of the angle between the axis of the mutor and the axis of the driving shaft. Thus, when the angle is 30° the speed ratio of the driving shaft to the driven shaft is as 1 to the versed sine of 30°, that is, as 1 to .13397; when the angle is 45°, the speed ratio is as 1 to the versed sine of 45°, that is, as one to .29289; when the angle is 60° the speed ratio is as 1 to the versed sine of 60°, that is, as 1 to .5.

It is found that for a given angle between the axis of the mutor and the axis of the driving shaft, each point of contact between the mutor and the spherical shell follows a certain path. The track of each gripping roller in the inner surface of the spherical shell is a zig-zag, the amplitude of which increases with the increase of the angle between the axis of the mutor and the axis of the driving shaft. In Fig. 13 is shown diagrammatically and graphically two such paths as far as they are formed by one rotation of the driving shaft at each of two different angles of nutation, that is, at each of two different angles between the axis of the mutor and the axis of the driving shaft. The path formed for the larger angle is indicated by the heavy line of large amplitude. The path formed for the smaller angle is indicated by the heavy part of the line of smaller amplitude for one rotation of the driving shaft, the same being continued by a lighter line for two more rotations of the driving shaft. While the particular point of contact under consideration between the mutor and the spherical shell describes the path indicated for one rotation of the driving shaft at the greater angle, its position in a circumferential line about the axis of the driving shaft advances from one extreme of the figure to the other and the distance through which it thus advances represents a portion of a rotation of the driven shaft. In the same manner while the point of contact for the smaller angle describes the path shown for one rotation of the driving shaft, it advances in the same direction through a distance which represents a portion of a rotation of the driven shaft produced by one rotation of the driving shaft. Now it will be seen that the distance advanced for the larger angle is greater than the distance advanced for the smaller angle, the distance advanced for the greater angle being, in the example shown, three times the distance advanced for the smaller angle.

It is of course understood that the gripping bodies carried by the mutor in the construction shown in Fig. 1 of the drawings are not necessarily rollers but, for the purposes of this explanation, they may be regarded as rollers and the path formed by one of such rollers as indicated in Fig. 13 may readily be conceived and it will be seen that as one of the rollers rolls on the zigzag path it also advances from one side of the figure to the other, carrying with it the mutor in a movement of rotation, and that such movement of advance from one side to the other is greater with the greater angle.

Referring now to the embodiment of the invention shown in Figs. 6 and 7 it will be seen that the arrangement of the nutating body or mutor, the driver, the means for imparting to the mutor its nutating movement and the means for varying the angular position of the nutating body or mutor are the same as described with reference to Figs. 1–5. The construction of the coöperating body or spherical bearing is also substantially the same as that described, except that the internally spherical bearing is formed wholly in one piece $h^3$, for convenience in manufacture, and is secured between two parts $h^4$ and $h^5$ which complete the shell or casing. The nutating body or mutor $i$ is provided with rollers $k$ as before. In place of the direct connection between the nutating body or mutor and the driven part, however, there is substituted a means for transmitting the rotary movement of the mutor to the driven part which permits the speed ratio to be further reduced to about ten to six. This means of imparting rotary movement is itself dependent upon the nutating movement of the mutor and embodies the same principle of operation as that which results in the continuous forward rotary movement of the mutor or nutating body on its own axis. This embodiment of the invention also illustrates a possible different arrangement and relation of the nutating body and its coöperating part. In this form the nutating body or mutor $i$ is itself formed with an internal spherical bearing surface $i^7$ for coöperation with rollers $m^7$ which are mounted, in the same manner as the rollers $k$, in a carrier $m^8$ which is fixed on the driven shaft $m$. The rollers $m^7$ bear against the spherical bearing $i^7$ during the nutations of the mutor $i$ in the same manner that the rollers $k$ bear against the spherical bearing $h^3$. A relative lateral movement of each roller on the carrier, whether caused by a relative rotary movement of the carrier with respect to the mutor or of the mutor with respect to the carrier, causes it to press tightly against and grip the spherical bearing surface. If the nutating body or mutor be regarded as a nutating body only, without rotary movement about its own axis, it will be seen that the component, in a circumferential direction, of the movement of any point on an internal spherical bearing surface $i^7$ of the nutating body or mutor, with which a roller $m^7$ is in contact, causes such roller to have a movement in the same circumferential direction. Consequently the nutating movement alone of the nutating body or mutor imparts to its coöperating body or bearing a continuous forward rotary movement, even if the nutating body itself has no continuous forward rotary movement. It will be understood, therefore, that the invention may be realized in a structure in which the coöperating part has a movement of rotation and the nutating part has no motion of rotation about its own axis. It will also be seen that as the nutating part, in the construction shown, has a movement of rotation about its own axis as well as a movement of nutation and that such rotary movement will be imparted to the coöperating body by the gripping action between the rollers and the nutating body or mutor, the movement imparted to the driven part, such as the shaft $m$, is a resultant of the rotating movement and the nutating movement. If it were a resultant of the rotating movement alone the speed of rotation of the driven part would be the same as the speed of rotation of the nutating body about its own axis, as is the case in the construction shown in Figs. 1–5. The component of the rotary movement of the driven part which is due to the nutating movement of the mutor is in addition to the component due to the rotary movement of the mutor about its own axis, so that the speed of rotation of the driven part is greater than the speed of rotation of the mutor about its own axis. In the construction shown in Figs. 1–5, in which the driven part has the same speed of rotation as the mutor, the maximum speed ratio between the driving shaft and the driven shaft is about ten to three, whereas in the construction shown in Figs. 6 and 7, for the reasons just explained, the maximum speed ratio of the driving shaft to the driven shaft is about ten to six.

Referring now to the embodiment of the invention shown in Figs. 8 and 9 it will be seen that the arrangement of the nutating body or mutor, the driver, the means for imparting to the mutor its nutating movement and the means for varying the angular position of the nutating body or mutor are substantially the same as already described. The driving shaft $a$ is itself longitudinally movable, having a grooved collar $e$ which is engaged by a forked lever $f$. The head $a'$ of the shaft is slotted as at $a^4$ and has pivoted therein the link $g$ which constitutes the means for imparting to the nutating body or mutor its nutating and rotating movements and also constitutes, through the longitudinal movement of the shaft $a$, the means for varying the angular displacement of the nutating body. The link $g$ is connected with the nutating body or mutor $i$ substantially in the same manner as already described, carrying a sleeve $i^2$ which embraces the stud $i'$ of the mutor, the sleeve $i^2$ being somewhat shorter than the stud so that it may have a limited longitudinal movement thereon. The link is pivoted in the shaft in the plane of the axis and has a toe $g'$ which bears against the mutor at one side of its axis, so that when the longitudinal movement of the shaft $a$ commences, from the zero position, the pressure is exerted against the mutor at one side of its axis and therefore starts the mutor from its central position, the sleeve $i^2$ sliding on the stud $i'$ until the mutor has moved sufficiently from its axial or zero position to permit the continued thrust of the link to be exerted upon it through the stud $i'$. The pivoting of the link in the axial plane of the shaft prevents an unbalancing of the load when the driving shaft is rotating and the mutor is in its axial or zero position, and the unbalancing of the load in other positions is prevented by providing the link with a counterbalance $g^2$ in rear of its pivot, which substantially balances the link when the link is in any other than the axial or zero position.

The coöperating part or spherical bearing $h^3$, as shown in Figs. 6 and 7, is formed wholly in one piece which is secured between the two parts $h^4$ and $h^5$ which complete the shell or casing. In order to provide for slip between the driver and the driven part of the transmission device in emergencies, as in the case of a sudden change from high to low speed, the spherical bearing or coöperating body $h^3$ is held yieldingly between the parts $h^4$ and $h^5$ of the shell, which are separated slightly and are held together yieldingly by means of bolts $h^6$, between the heads and nuts of which and the corresponding abutments on the parts $h^4$ and $h^5$ of the shell are placed springs $h^7$. By setting up the bolts $h^6$ more or less the pressure with which the bearing piece $h^3$ is held between the parts $h^4$ and $h^5$ may be varied and the degree of force required to rotate the bearing piece is regulated. In the ordinary operation of the transmission device the bearing piece $h^3$ is stationary and the mutor reacts against it through the clutching action of the revoluble bearings, but if the stress induced by a sudden change of speed is so great as to render liable the breakage of parts, the bearing piece will yield, rotating with the mutor, and so prevent breakage.

In the various forms of the transmission device shown in Figs. 1–7 the revoluble bearing bodies between the mutor and the coöperating body or spherical bearing are shown as rollers. In some cases, especially if the crushing strains are excessive, spherical bearing bodies or balls may be substituted for the rollers.

As shown in Figs. 8 and 9 the outer surface of the nutating body or mutor $i$ is formed with a peripheral series of flats or tangential bearing surfaces $i^8$, upon which rest balls $k^6$ which may be held in place on the surface of the mutor by ball retainers $k^7$. These balls act in the same manner as do the rollers already described, permitting the free nutating movements of the mutor and acting as gripping rollers between the mutor and the coöperating body or spherical bearing to provide the points of reactance necessary for the production of the rotary movement. Similarly balls may replace the rollers shown in Figs. 6 and 7 which constitute the means by which the rotary movement of the mutor is imparted to the driven shaft. The driven shaft $m$ has a spherical head or bearing surface $m^7$ which is formed with flats or tangential bearing surfaces $m^8$. On these flats or tangential bearing surfaces bear balls $m^9$ which may be held in place by retainers $m^{10}$ and coact with the internally spherical surface $i^7$ of the nutating body or mutor $i$.

The embodiment of the invention shown in Fig. 10 is substantially the same as that shown in Figs. 6 and 7 with respect to the relation of the nutating body to the coöperating part and to the driven shaft and the same as that shown in Figs. 8 and 9 with respect to the means for imparting to the mutor its nutating movement and for varying its angular displacement. In the construction shown in Figs. 8 and 9 provision is made for permitting the yielding of the coöperating part for the purpose of preventing breakage in case of sudden stresses. In some applications of the invention it may be desirable to provide for decoupling between the driver and the driven part, that is, for permitting the driven part to be brought to rest at will regardless of the rotation of the driver and the angular displacement of the nutating body or mutor. Provision is made for this in the construction shown in Fig. 10, in which the coöperating part or spherical bearing $h^8$ is shown as formed in one piece held releasably in the outer shell or casing which consists of the end members $h^9$ and $h^{11}$ and the cylindrical body member $h^{10}$. At each end of the coöperating body or spherical bearing is placed an annular friction plate $h^{12}$ $h^{13}$. An annular movable head $h^{14}$ is pressed against the friction plate $h^{13}$ so as to clamp the coöperating part $h^8$ between the friction plates and hold it normally from rotation, by spring plungers $h^{15}$ which are carried by the end plate $h^{11}$. The hub $h^{16}$ of the movable head $h^{14}$ is extended outward beyond the hub of the end plate $h^{11}$ and is formed with a coarse screw thread to receive a lever nut $h^{17}$. By rotation of the lever nut $h^{17}$ in the proper direction the movable head $h^{14}$ may be withdrawn against the pressure of the spring plungers $h^{15}$ so as to release the coöperating part or frictional bearing $h^8$ and permit it to turn with the nutating body.

The nutating body or mutor then has no points of reactance against a stationary part and consequently has no forward rotation on its own axis. Furthermore, as it has no points of reactance, it is free to be rotated backward by the coöperating action of its internal spherical bearing surface $i^7$ and is therefore incapable of producing any rotation of the driven part against resistance. Consequently, when the coöperating part $h^8$ is free to turn no movement of rotation will be imparted to the driven part $m$ whatever may be the speed of rotation of the driver or the angular displacement of the mutor.

The structure shown in Fig. 10 and just described lends itself to a direct drive from the driving shaft $a$ to the driven shaft, if such a direct drive be desirable. A device adapted for this purpose is shown in Fig. 11 in which the friction plate $h^{13}$ is shown as secured by screws $h^{18}$ to the coöperating part or spherical bearing $h^8$. Keyed on the driven shaft $m$ is a friction plate $m^{11}$ and mounted loosely on the hub of the friction plate $m^{11}$ is another friction plate $m^{12}$, the friction plate $h^{13}$ being located between the friction plates $m^{11}$ and $m^{12}$. The hub of the friction plate $m^{11}$ is formed with an annular cam shoulders $m^{13}$ and the rim of the nutating body $i$ is formed, as at $i^8$, so as to coact with the annular cam shoulder $m^{13}$ and the friction plate $m^{12}$, so that when the nutating body is thrown to its extreme position, as shown in Fig. 11, it will press the friction plate $m^{12}$ firmly toward the friction plate $m^{11}$ and clamp the friction plate $h^{13}$ firmly between them, thereby directly connecting the spherical bearing or coöperating body $h^8$ with the driven shaft $m$. It being assumed that the coöperating body or spherical bearing is released by the drawing back of the clamping head $h^{14}$ when the nutating body is thrown into the extreme position shown in Fig. 11, so that the coöperating body or spherical bearing $h^8$ is then free to rotate, it will be seen that as the coöperating body or spherical bearing is then rotated, through the nutating body, at the same speed as the driving shaft, and as the driven shaft is connected to the coöperating part or spherical bearing so as to rotate therewith, the driven shaft must also be rotated at the same speed as the driving shaft.

The change of radial distance between the outermost point of the periphery of each ball or roller carried by the nutating body, which is necessary to effect the gripping action between the nutating body and the coöperating part or spherical bearing, may be effected by means other than the lateral shifting of the roller on the tangent or chord of the nutating body, or the rolling of a ball on such a tangent or chord. One form of such other means is shown in Figs. 12 and 13. In the construction shown in these two figures of the drawings the driving shaft $a$, the link $g$, the nutating body $i$ and the coöperating part or body or spherical bearing $h^8$ are arranged as shown in Fig. 12. The nutating body $i$ is also provided with rollers $k$, substantially as described, but the rollers have no lateral movement on or with respect to the nutating body. The latter is formed with cuts $i^9$ which extend from its rim nearly to its base or hub, so that each roller $k$ is supported by a relatively yielding portion of the nutating body. Within the nutating body is a carrier $n$ which nutates with the nutating body but may have a limited, relative rotary movement. It is shown as having at its pole a stud $n'$ which enters an axial recess in the hub or head of the nutating body as a centering device and guide. The carrier $n$ has formed in its outer surface, near its rim, a ball race $n^2$ and the nutating body has formed in its inner surface, near its rim, a corresponding ball race $i^{10}$. These ball races, or both of them, at any rate, are not truly circular, but are made up, or at least one of them, of a series of shallow tapered pockets, as shown in Fig. 13, in each one of which is placed a ball $n^3$. It will now be seen that any relative rotation of the carrier and the nutating body will cause the nutating body to expand and to press its rollers $k$ firmly against the coöperating body or spherical bearing $h^8$ so that the rollers shall have the points of reactance against the spherical bearing which are necessary to secure the desired forward rotation of the nutating body on its own axis. The relative rotary movement of the nutating body and carrier necessary to effect the expansion of the nutating body is secured through the resistance of the driven shaft $m$, to which the carrier may be directly connected through a linkage such as that already described with respect to the construction shown in Fig. 1.

Various other structures will suggest themselves as possible embodiments of the invention to suit different conditions of use and it will be understood that the invention is not limited to any of the forms shown and described herein but is capable of realization in structures which may differ widely in appearance and in non-essential details.

I claim as my invention:—

1. A power transmission device comprising a rotatable mutor, a coöperating body concentric with the mutor, one of said parts having a spherical bearing surface and the other of said parts having gripping elements to coöperate with the spherical bearing surface, means to vary the relative angular axial position of said parts, and driving means for one of said parts.

2. A power transmission device comprising a rotatable mutor, a coöperating body concentric with the mutor, one of said parts having a spherical bearing surface and the other of said parts having gripping elements to coöperate with the spherical bearing surface, means to vary the relative angular axial position of said parts, means to rotate one of said parts, and means to transmit a movement of rotation from the other of said parts.

3. A power transmission device comprising a mutor, means to impart to the mutor a movement of nutation and a consequent movement of rotation on its own axis, and means to impart the movement of rotation of the mutor on its own axis to the driven part.

4. A power transmission device comprising a nutating body, a coöperating body, one of said bodies having a spherical bearing surface and gripping elements carried by the other of said bodies and coöperating with said spherical bearing surface, whereby one of said bodies acquires, through the nutation of the nutating body, a movement of rotation on its own axis.

5. A power transmission device comprising a nutating body, a spherical body for coöperation with the nutating body and driving means between said two first named bodies whereby one of said first named bodies acquires, through the nutation of the nutating body a movement of rotation on its own axis.

6. A power transmission device comprising a nutating body, a coöperating body, one of said bodies having a spherical bearing surface, and rolling gripping elements carried by the other of said bodies and coöperating with said spherical bearing surface.

7. A power transmission device comprising a mutor, a body for coöperation with the mutor and concentric therewith, the mutor and the coöperating body having the one a spherical bearing surface and the other gripping elements for coaction, and means to impart movement of nutation to the mutor whereby one of said two first named parts acquires through the nutation of the nutating body a movement of rotation upon its own axis.

8. A power transmission device comprising a mutor, a body for coöperation with the mutor and concentric therewith, the mutor and the coöperating body having the one a spherical bearing surface and the other rolling gripping elements for coaction with said spherical bearing surface, and means to impart the movement of rotation of the mutor on its own axis to the driven part.

9. A power transmission device comprising a mutor, a body for coöperation with the mutor and concentric therewith, the mutor and the coöperating body having the one a spherical bearing surface and the other gripping elements for coaction with said spherical bearing surface, means to impart a movement of nutation to the mutor, and means to vary the angle of nutation of the mutor.

10. A power transmission device comprising a driver, a driven part axially in line with the driver, a mutor, means to impart a movement of nutation to the mutor, and means whereby the driven part acquires a movement of rotation through the nutating movement of the mutor.

11. A power transmission device comprising a driver, a driven part, a mutor, means to impart from the driver to the mutor a movement of nutation, a body coöperating with the mutor whereby the mutor acquires a movement of rotation on its own axis, and means to impart the movement of rotation of the mutor to the driven part.

12. A power transmission device comprising a driver, a driven part axially in line with the driver, a mutor, means to impart movement of nutation to the mutor, means to vary the angle of nutation of the mutor, and means whereby the driven part acquires a movement of rotation through the nutating movement of the mutor.

13. A power transmission device comprising a driver, a driven part, a mutor, means to impart from the driver to the mutor a movement of nutation, means to vary the angle of nutation of the mutor, a body coöperating with the mutor whereby the mutor acquires a movement of rotation on its own axis, and means to impart the movement of rotation of the mutor to the driven part.

14. A power transmission device comprising a driver, a driven part, a mutor, means to impart to the mutor from the driver a movement of nutation, an internally spherical bearing for coöperation with the mutor whereby the mutor acquires through its nutating movement a movement of rotation on its own axis, and means to impart the movement of rotation of the mutor to the driven part.

15. A power transmission device comprising a driver, a driven part, a mutor, means to impart to the mutor from the driver a movement of nutation, means to vary the angle of nutation of the mutor, an internally spherical bearing for coöperation with the mutor whereby the mutor acquires through its nutating movement a movement of rotation on its own axis, and means to impart the movement of rotation of the mutor to the driven part.

16. A power transmission device comprising a driver, a driven part, a mutor, a means to impart to the mutor from the driver a movement of nutation, rolling gripping elements carried by the mutor, an internally spherical bearing for coöperation with the gripping bodies of the mutor whereby the mutor acquires through its nutating movement a movement of rotation on its own axis, and means to impart the movement of rotation of the mutor to the driven part.

17. A power transmission device comprising a longitudinally movable driving shaft, a driven part, a mutor, a link connection between the driving shaft and the mutor, an internally spherical bearing for coöperation with the mutor whereby the mutor acquires through its nutating movement a movement of rotation on its own axis, and means to impart the movement of rotation of the mutor to the driven part.

18. A power transmission device comprising a driver, a driven part, a mutor, means to impart to the mutor from the driver a movement of nutation, an internally spherical bearing for coöperation with the mutor whereby the mutor acquires through its nutating movement a movement of rotation on its own axis, and a link connection between the mutor and the driven part whereby the movement of rotation of the mutor is imparted to the driven part.

19. A power transmission device comprising a driver, a driven part, a mutor, means to impart to the mutor from the driver a movement of nutation, an internally spherical bearing for coöperation with the mutor whereby the mutor acquires through its nutating movement a movement of rotation on its own axis, means to impart the movement of rotation of the mutor to the driven part, and means to hold the spherical bearing yieldingly from rotation.

20. A power transmission device comprising a driver, a driven part, a mutor, means to impart to the mutor from the driver a movement of nutation, an internally spherical bearing for coöperation with the mutor whereby the mutor acquires through its nutating movement a movement of rotation on its own axis, means to impart the movement of rotation of the mutor to the driven part, means to hold the spherical bearing yieldingly from rotation, and means to vary the angle of nutation of the mutor.

21. A power transmission device comprising a driver, a driven part, a mutor, means to impart to the mutor from the driver a movement of nutation, an internally spherical bearing for coöperation with the mutor whereby the mutor acquires through its nutating movement a movement of rotation on its own axis, means to impart the movement of rotation of the mutor to the driven part, means to hold the spherical bearing yieldingly from rotation, means to vary the angle of nutation of the mutor, and means whereby the internally spherical bearing is released through variation of the angle of nutation of the mutor.

22. A power transmission device comprising a driver, a driven part, a mutor, means to impart to the mutor from the driver a movement of nutation, an internally spherical bearing for coöperation with the mutor, and means to connect operatively the spherical bearing and the driven part.

23. A power transmission device comprising a driver, a driven part, a mutor, means to impart to the mutor from the driver a movement of nutation, an internally spherical bearing for coöperation with the mutor whereby the mutor acquires through its nutating movement a movement of rotation on its own axis, means to impart the movement of rotation of the mutor to the driven part, means to hold the spherical bearing yieldingly from rotation, and means to connect operatively the spherical bearing with the driven part.

24. A power transmission device comprising a driver, a driven part, a mutor, means to impart to the mutor from the driver a movement of nutation, an internally spherical bearing for coöperation with the mutor whereby the mutor acquires through its nutating movement a movement of rotation on its own axis, means to impart the movement of rotation of the mutor to the driven part, means to hold the spherical bearing yieldingly from rotation, means to connect operatively the spherical bearing with the driven part, and means to vary the angle of nutation of the mutor.

This specification signed and witnessed this tenth day of May A. D., 1913.

CARL W. WEISS.

Signed in the presence of—
W. B. GREELEY,
WORTHINGTON CAMPBELL.